(12) United States Patent
MacGougan et al.

(10) Patent No.: US 10,309,775 B2
(45) Date of Patent: Jun. 4, 2019

(54) ALTITUDE ESTIMATION USING CROWD-SOURCED PRESSURE SENSOR DATA

(71) Applicant: Apple Inc., Cupertino, CA (US)

(72) Inventors: Glenn D. MacGougan, Cupertino, CA (US); Changlin Ma, San Jose, CA (US); Robert W. Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 823 days.

(21) Appl. No.: 14/639,652

(22) Filed: Mar. 5, 2015

(65) Prior Publication Data

US 2016/0258749 A1      Sep. 8, 2016

(51) Int. Cl.
*G01C 5/06* (2006.01)
*G01S 19/13* (2010.01)

(52) U.S. Cl.
CPC .............. *G01C 5/06* (2013.01); *G01S 19/13* (2013.01)

(58) Field of Classification Search
None
See application file for complete search history.

(56) References Cited

U.S. PATENT DOCUMENTS

| 6,735,542 B1 | 5/2004 | Burgett et al. |
| 8,781,494 B2 | 7/2014 | Kuehnel |
| 2014/0012529 A1 * | 1/2014 | Lee ................ G01C 5/06 702/94 |
| 2014/0081572 A1 | 3/2014 | Poornachandran et al. |
| 2014/0135040 A1 | 3/2014 | Edge et al. |
| 2014/0136135 A1 | 5/2014 | Drukier et al. |
| 2015/0011246 A1 | 1/2015 | Mohammad Mirzaei et al. |

FOREIGN PATENT DOCUMENTS

WO      2014202111      12/2014

* cited by examiner

*Primary Examiner* — Cheung Lee
(74) *Attorney, Agent, or Firm* — Treyz Law Group, P.C.; Kendall W. Abbasi

(57) ABSTRACT

An electronic device may include a pressure sensor for measuring barometric pressure. Pressure measurements may be calibrated using crowd-sourced pressure data to remove any weather bias or sensor bias associated with the pressure measurements. Altitude of the electronic device may be determined using the calibrated pressure measurement. When it is desired to estimate altitude, the electronic device may transmit a query to a server, which returns a local reference pressure value for the electronic device based on crowd-sourced pressure data from electronic devices in the vicinity of the electronic device making the query. To determine the local reference pressure value, the server may correlate the crowd-sourced pressure data with space, taking into account variations in terrain using digital elevation models to determine location-specific reference pressures. The local reference pressure value for a given electronic device is then determined using crowd-sourced reference pressures at nearby locations.

8 Claims, 8 Drawing Sheets

ALTITUDE ESTIMATION USING CROWD-SOURCED PRESSURE SENSOR DATA

BACKGROUND

This relates generally to electronic devices and, more particularly, to electronic devices having pressure sensors for gathering information about the electronic device and the environment.

Electronic devices often include sensors and other circuitry for detecting movement of the electronic device and for characterizing its surroundings. For example, inertial sensors such as an accelerometer or gyroscope are sometimes used to detect a rapid change in acceleration or orientation. Global Positioning System receiver circuitry and/or IEEE 802.11 (WiFi®) transceiver circuitry are sometimes used to determine where the electronic device is located. Infrared proximity sensors are used to detect when an electronic device is being held against a user's ear during a telephone call so that display and touch sensor circuitry can be temporarily disable during the call.

However, the decisions that an electronic device makes based on these types of sensors and circuitry may not always be reliable. Measuring vertical displacement with an accelerometer requires double integration of accelerometer data, and the noise associated with the accelerometer data may be too high to do this reliably. Global Positioning System receiver circuitry typically cannot be used inside of a building because the building blocks satellite signals. WiFi®-assisted positioning can be inaccurate due to multiple reflections of the radio signals. Infrared light from an infrared proximity sensor may be absorbed by dark hair, making it difficult to detect the user's head near the electronic device.

It would therefore be desirable to provide improved circuitry and methods for detecting movement and determining vertical displacement of an electronic device.

SUMMARY

An electronic device may include one or more pressure sensors for measuring barometric pressure. Pressure measurements may be calibrated using crowd-sourced pressure data to remove any weather bias or sensor bias associated with the pressure measurements. Altitude of the electronic device may be determined using the calibrated pressure measurement.

When it is desired to estimate altitude, the electronic device may transmit a query to a server over a wireless network. This may include, for example, providing to the server a geographic location of the electronic device as determined by global navigation satellite system receiver circuitry. In response to the query, the server may determine a local reference pressure value for the electronic device based on crowd-sourced pressure data from electronic devices in the vicinity of the electronic device making the query. The server may transmit the local reference pressure value to the electronic device over the wireless network.

Because the local reference pressure is determined using pressure measurements from a large number of devices, the local reference pressure value may be indicative of a weather bias associated with local atmospheric weather conditions. When it is desired to estimate the altitude of an electronic device using a pressure measurement, control circuitry in the electronic device may subtract the weather bias from the pressure measurement. The control circuitry may then convert the calibrated pressure measurement to altitude using a standard atmosphere model.

If desired, control circuitry may also determine a sensor bias associated with the pressure sensor to further refine the altitude estimate. The sensor bias may be a known value stored in the electronic device, may be a value that varies with the temperature that can be determined using a look-up table stored in the electronic device, or may be a value that can be determined using crowd-sourced pressure data.

To determine the local reference pressure value, a server may gather pressure sensor measurements from a number of electronic devices. Based on the gathered pressure measurements, the server may determine reference pressure values for respective geographic locations. When a query is received from an electronic device, the server may provide the electronic device with a local reference pressure value based on the reference pressure values determined at nearby geographic locations. The correlation between reference pressure sample points may be determined using digital elevation models or least squares collocation.

DETAILED DESCRIPTION

Figure 1:
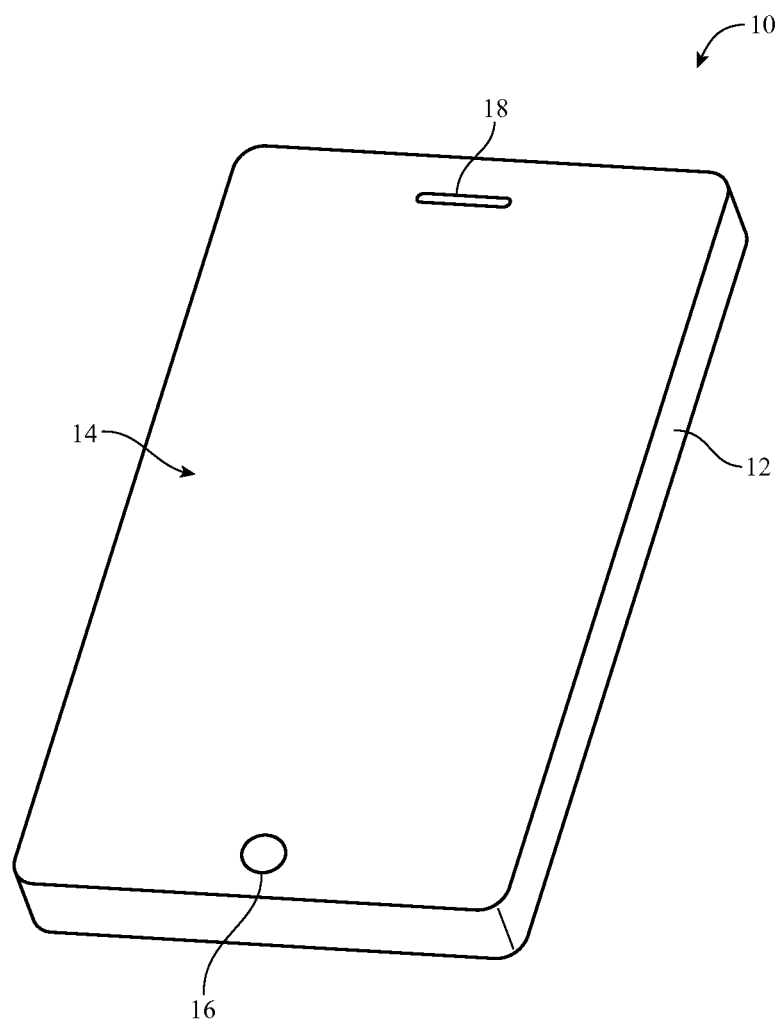
FIG. 1 is a perspective view of an illustrative electronic device that may be provided with one or more pressure sensors in accordance with an embodiment of the present invention.

An illustrative electronic device that may be provided with one or more pressure sensors is shown in FIG. 1. Electronic device 10 of FIG. 1 may be a handheld electronic device or other electronic device. For example, electronic device 10 may be a cellular telephone, media player, or other handheld portable device, a somewhat smaller portable device such as a wrist-watch device, pendant device, or other wearable or miniature device, gaming equipment, a tablet computer, a notebook computer, a desktop computer, a television, a computer monitor, a computer integrated into a computer display, or other electronic equipment.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies. The brightness of display 14 may be adjustable. For example, display 14 may include a backlight unit formed from a light source such as a lamp or light-emitting diodes that can be used to increase or decrease display backlight levels and thereby adjust display brightness. Display 14 may also include organic light-emitting diode pixels or other pixels with adjustable intensities. In this type of display, display brightness can be adjusted by adjusting the intensities of drive signals used to control individual display pixels.

Display 14 may be protected using a display cover layer such as a layer of transparent glass or clear plastic. Openings may be formed in the display cover layer. For example, an opening may be formed in the display cover layer to accommodate a button such as button 16. An opening may also be formed in the display cover layer to accommodate ports such as speaker port 18.

In the center of display 14, display 14 may contain an array of active display pixels. This region is sometimes referred to as the active area of the display. A rectangular ring-shaped region surrounding the periphery of the active display region may not contain any active display pixels and may therefore sometimes be referred to as the inactive area of the display. The display cover layer or other display layers in display 14 may be provided with an opaque masking layer in the inactive region to hide internal components from view by a user.

Figure 2:
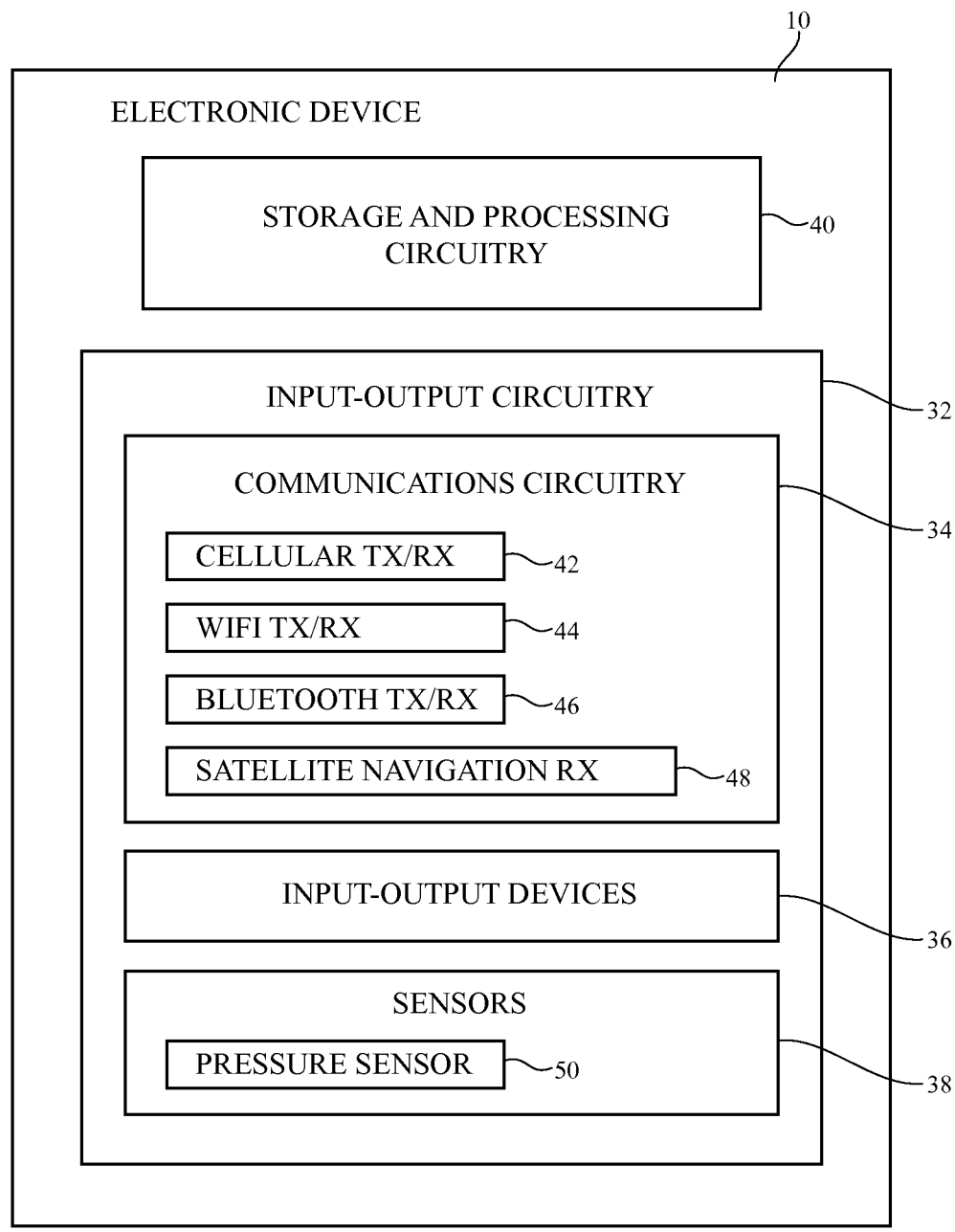
FIG. 2 is a schematic diagram of an illustrative electronic device that may be provided with one or more pressure sensors in accordance with an embodiment of the present invention.

A schematic diagram of device 10 is shown in FIG. 2. As shown in FIG. 2, electronic device 10 may include control circuitry such as storage and processing circuitry 40. Storage and processing circuitry 40 may include one or more different types of storage such as hard disk drive storage, nonvolatile memory (e.g., flash memory or other electrically-programmable-read-only memory), volatile memory (e.g., static or dynamic random-access-memory), etc. Processing circuitry in storage and processing circuitry 40 may be used in controlling the operation of device 10. The processing circuitry may be based on one or more microprocessors, microcontrollers, digital signal processors, baseband processor integrated circuits, application specific integrated circuits, etc.

With one suitable arrangement, storage and processing circuitry 40 may be used to run software on device 10 such as Internet browsing applications, email applications, media playback applications, activity logging applications, fitness applications, operating system functions, software for capturing and processing images, software implementing functions associated with gathering and processing sensor data, software that makes adjustments to display brightness and touch sensor functionality, etc.

To support interactions with external equipment, storage and processing circuitry 40 may be used in implementing communications protocols. Communications protocols that may be implemented using storage and processing circuitry 40 include Internet protocols, wireless local area network protocols (e.g., IEEE 802.11 protocols—sometimes referred to as WiFi®), protocols for other short-range wireless communications links such as the Bluetooth® protocol, etc.

Input-output circuitry 32 may be used to allow input to be supplied to device 10 from a user or external devices and to allow output to be provided from device 10 to the user or external devices.

Input-output circuitry 32 may include wired and wireless communications circuitry 34. Communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications). As shown in FIG. 2, circuitry 34 may include one or more radio-frequency transceivers such as cellular telephone transceiver circuitry 42 (e.g., one or more cellular telephone transmitters and/or receivers), IEEE 802.11 (WiFi®) transceiver circuitry 44 (e.g., one or more wireless local area network transmitters and/or receivers), Bluetooth® transceiver circuitry 46 such as a Bluetooth® Low Energy (Bluetooth LE) transmitter and/or receiver, and satellite navigation system receiver circuitry 48 (e.g., a Global Positioning System receiver or other satellite navigation system receiver).

Input-output circuitry 32 may include input-output devices 36 such as buttons, joysticks, click wheels, scrolling wheels, touch screens, other components with touch sensors such as track pads or touch-sensor-based buttons, vibrators, audio components such as microphones and speakers, image capture devices such as a camera module having an image sensor and a corresponding lens system, keyboards, status-indicator lights, tone generators, key pads, keyboards and other equipment for gathering input from a user or other external source and/or generating output for a user.

Sensor circuitry such as sensors 38 of FIG. 2 may include an ambient light sensor for gathering information on ambient light levels, proximity sensor components (e.g., light-based proximity sensors and/or proximity sensors based on other structures), accelerometers, gyroscopes, magnetic sensors, and other sensor structures. Sensors 38 of FIG. 2 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology). If desired, other components in device 10 may be formed using microelectromechanical systems technology.

To detect and characterize movement and location of electronic device 10 and to detect and characterize the environment around electronic device 10, sensors 38 may be provided with one or more pressure sensors 50. Pressure sensor 50 (sometimes referred to as pressure sensor circuitry 50, pressure sensor array 50, or pressure sensor structures 50) may include one or more pressure sensors that measure the air pressure of the surrounding environment. Pressure sensors 50 may, for example, include absolute barometric diaphragm-based pressure sensors formed from piezo-resistors embedded in a micro-machined silicon diaphragm (sometimes referred to as a piezo-resistive pressure sensor). This is, however, merely illustrative. If desired, other suitable pressure sensor technology may be used (e.g., strain gauge based pressure sensors having a metal strain gauge on a metal diaphragm, capacitive based pressure sensors having a parallel plate capacitor structure on a diaphragm, other suitable microelectromechanical systems based pressure sensors, etc.).

Pressure sensor circuitry 50 may, for example, be used to determine the altitude of electronic device 10 (e.g., the height of electronic device 10 relative to seal level or ground level). Control circuitry (e.g., storage and processing circuitry 40) may gather pressure measurements from pressure sensor circuitry 50 and may convert each pressure measurement to an altitude using a standard model of atmospheric pressure.

Challenges may arise when using a barometric pressure sensor to determine altitude. The local atmospheric pressure at a given altitude can vary due to different weather conditions. It is also possible that two pressure sensors at the same altitude and under the same weather conditions will output slightly different pressure readings due to manufacturing variations and other factors.

To obtain accurate altitude information using pressure sensor circuitry 50, electronic device 10 may calibrate pressure measurements from sensor 50 using crowd-sourced reference pressure sensor data. The crowd-sourced reference pressure data may be used to determine the weather bias associated with atmospheric weather conditions at a particular location, and if desired, the sensor bias associated with pressure sensor 50. The bias terms (e.g., offset due to weather conditions and offset due to the sensor itself) may be subtracted from the pressure measurement output from pressure sensor 50 to obtain a calibrated pressure value that can be used to accurately and reliably determine altitude.

Figure 3:
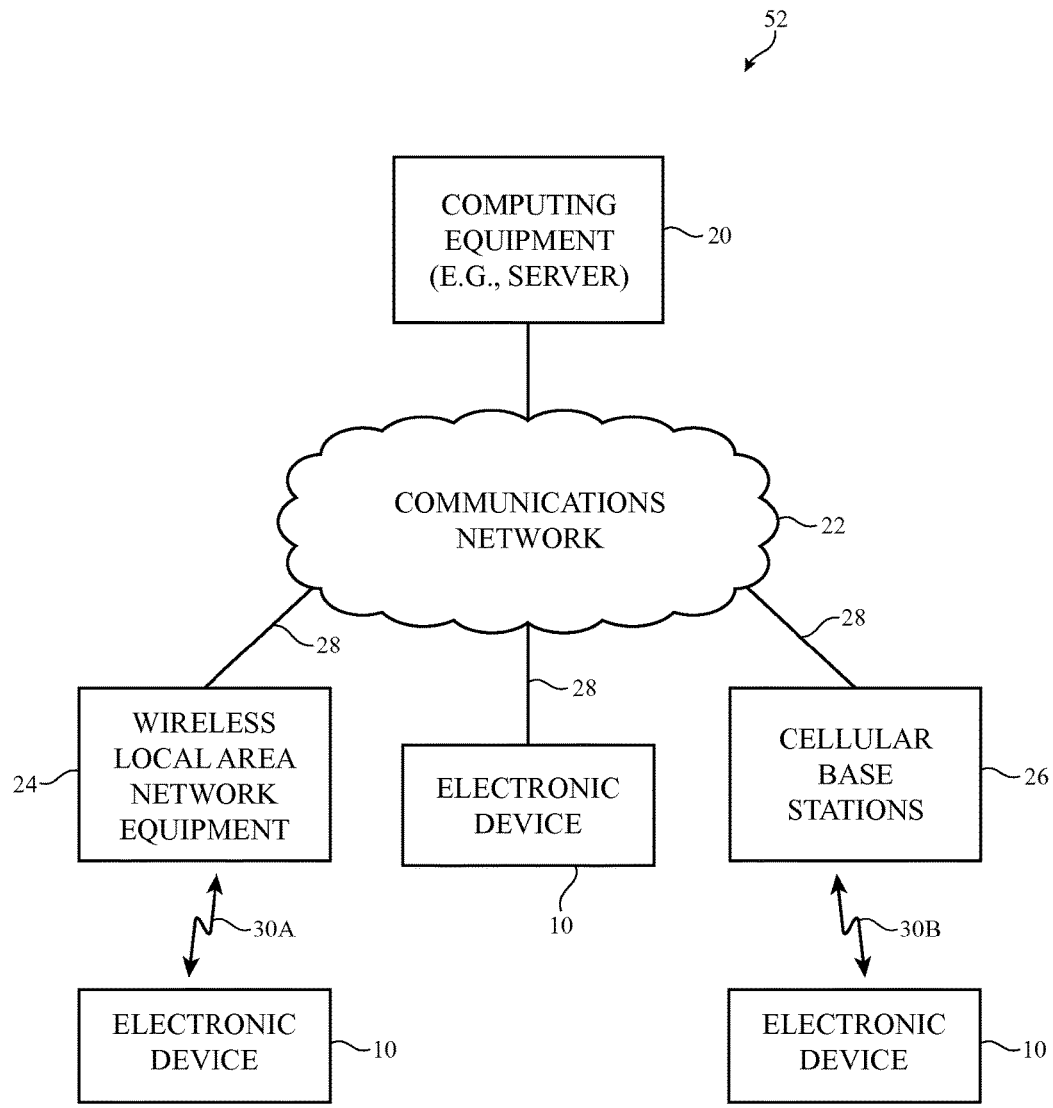
FIG. 3 is a diagram of an illustrative system in which multiple electronic devices having wireless communications circuitry may communicate with a server in accordance with an embodiment of the present invention.

An illustrative system in which an electronic device may communicate with a server to calibrate pressure sensor measurements is shown in FIG. 3. As shown in FIG. 3, system 52 may include a communications network such as network 22. Communications network 22 may include wired and wireless local area networks and wide area networks (e.g., the Internet). Equipment such as computing equipment 20 may be used in implementing online services. Computing equipment 20 may include one or more networked computers (e.g., servers) on which software is run to implement software-based services. The services that are hosted using computing equipment such as computing equipment 20 may include video server services, audio server services, web page services, communications services, media playback services, online storage services, social networking services, games, etc. The servers that are used in providing online services may be implemented using one or more computers that are located at one or more different geographic locations.

Electronic devices 10 may communicate with online service computing equipment 20 over communications network 22. In a typical wired connection arrangement, an electronic device may be connected to network 22 using a cable. The cable may connect the electronic device to equipment in network 22. For example, link such as link 28 of FIG. 1 may be used to interconnect an electronic device to network 22 (e.g., using a modem). Wireless links may also be formed as part of links 28 or other links in system 52.

For example, an electronic device may have a wireless local area network adapter that allows the device to communicate wirelessly with wireless local area network equipment such as wireless local area network equipment 24. Wireless local area network equipment 24 may, for example, be a router or access point that supports IEEE 802.11 communications (sometimes referred to as WiFi®). As illustrated in FIG. 3, one or more electronic devices 10 may be connected to the network by forming a local wireless link such as one of links 30A with equipment 24.

In addition to forming local wireless links, electronic devices 10 may form remote wireless links (i.e., links that may cover distances of a mile or more). Links of this type may be made, for example, with cellular telephone base stations such as cellular telephone base stations 26. In the example of FIG. 3, one of cellular base stations 26 is shown as forming a remote wireless communications link 30B with an associated one of electronic devices 10.

Wireless local area network equipment 24 and cellular base stations 26 may be connected to other equipment in network 22 using wired or wireless links (shown as links 28 in FIG. 3). Because wireless local area network equipment 24 and cellular base stations 26 serve to provide access to network 22, equipment 24 and cellular base stations 26 may serve as part of communications network 22 and are sometimes referred to as wireless network equipment. Other wireless equipment may also be used in network 22 and in forming wireless connections to network 22. The example of FIG. 3 is merely illustrative.

Server 20 may collect data from electronic devices 10 in system 52 and may relay information back to electronic devices 10 based on the collected data. Information collected from each electronic device 10 may include local atmospheric pressure measurements from pressure sensor 50 and location information indicating a location of electronic device 10 at a given time (e.g., location information from satellite navigation receiver 48 and/or from IEEE 802.11 (WiFi®) transceiver circuitry 44). For example, wireless communications circuitry 34 in each electronic device 10 may transmit pressure data from pressure sensor 50 to server 20 over wireless network 22, and server 20 may transmit crowd-sourced reference pressure information to electronic devices 10 over network 22. Server 20 may collect pressure measurements and location information from 5 or more devices, 10 or more devices, 50 or more devices, 100 or more devices, 1000 or more devices, or any other suitable number of electronic devices 10.

By collecting pressure measurements and location data from a large number of devices, server 20 can correlate atmospheric pressure patterns with location and time. This information can in turn be used to separate the weather component of a pressure sensor signal from the altitude component. For example, by gathering a large number of pressure samples from electronic devices at a given latitude and longitude, a reference pressure value can be derived for that particular location. Then, for an electronic device at that particular location, the difference between the electronic device's measured pressure value and the reference pressure value will more accurately indicate the altitude of the electronic device since the weather component of the measurement will be removed.

In one suitable arrangement, an algorithm can run continuously on server 20 to estimate reference pressure values at different locations based on crowd-sourced pressure samples from electronic devices 10. To correlate the reference pressure data with geographic location, the algorithm running on server 20 may use digital elevation models to select and adjust the models used for spatial correlation. For example, if there is a mountain between sample points, there is likely to be a weaker correlation between pressure samples at the sample points than if there were flat terrain between the sample points. If desired, server 20 may use methods such as least-squares collocation to spatially correlate the crowd-sourced pressure data.

Figure 4:
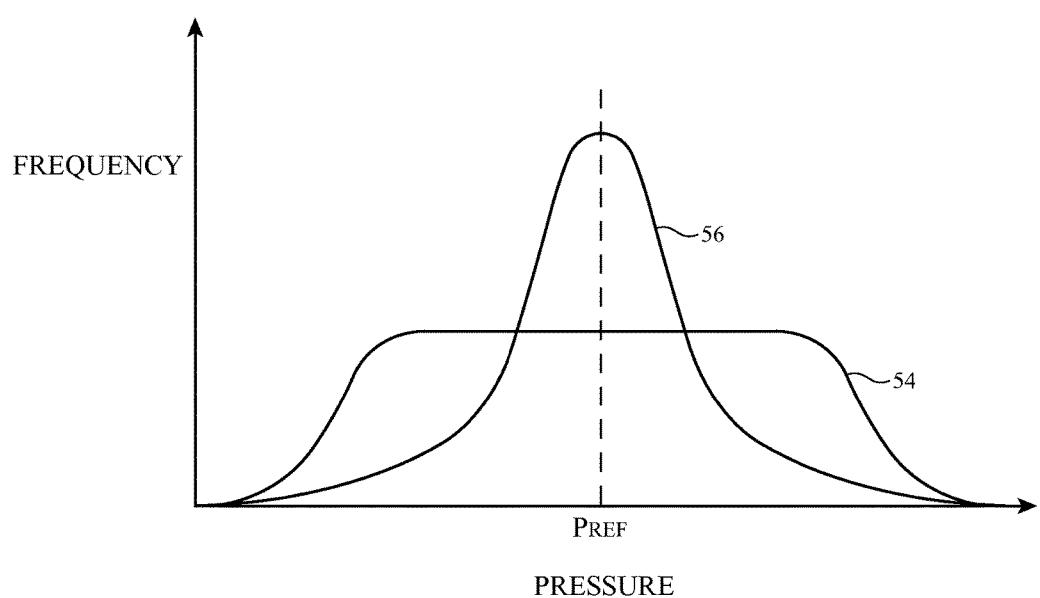
FIG. 4 is a graph showing illustrative pressure sensor data that may be crowd-sourced from multiple electronic devices in accordance with an embodiment of the present invention.

FIG. 4 is a graph showing illustrative pressure sensor data that may be crowd-sourced from a number of electronic devices in a given area. Curve 54 shows an illustrative distribution of pressure sensor measurements from electronic devices (e.g., 1000 electronic devices 10 of the type shown in FIGS. 1, 2, and 3) in a particular region (e.g., within a building, within a neighborhood, within a city, or within any other suitable area). Curve 56 shows an illustrative distribution of the average pressure sensor measurement from the electronic devices. To compute the average, N samples may be drawn from parent distribution 54 and averaged. This process is repeated a number of times, with the resulting average plotted to generate curve 56.

As the sample size increases (e.g., as the number of samples N increases), the distribution of the average will approach a normal distribution (according to the Central Limit Theorem), as indicated by curve 56. The distribution will be centered at $P_{REF}$ with some standard deviation. In general, any suitable sample size may be used (e.g., the number of samples N may be equal to 5, 10, 20, 50, 100, 1000 more than 1000 less than 1000 etc.).

Server 20 of FIG. 3 may receive pressure sensor measurements from electronic devices 10 in different regions and may compute a reference pressure value $P_{REF}$ for each region based on the received pressure measurements. For example, server 20 may gather pressure samples from 1000 devices at a particular location (e.g., a particular latitude and longitude) and may repeatedly compute an average of N samples drawn from the pressure samples to determine a reference pressure value $P_{REF}$ for that particular location.

Figure 5:
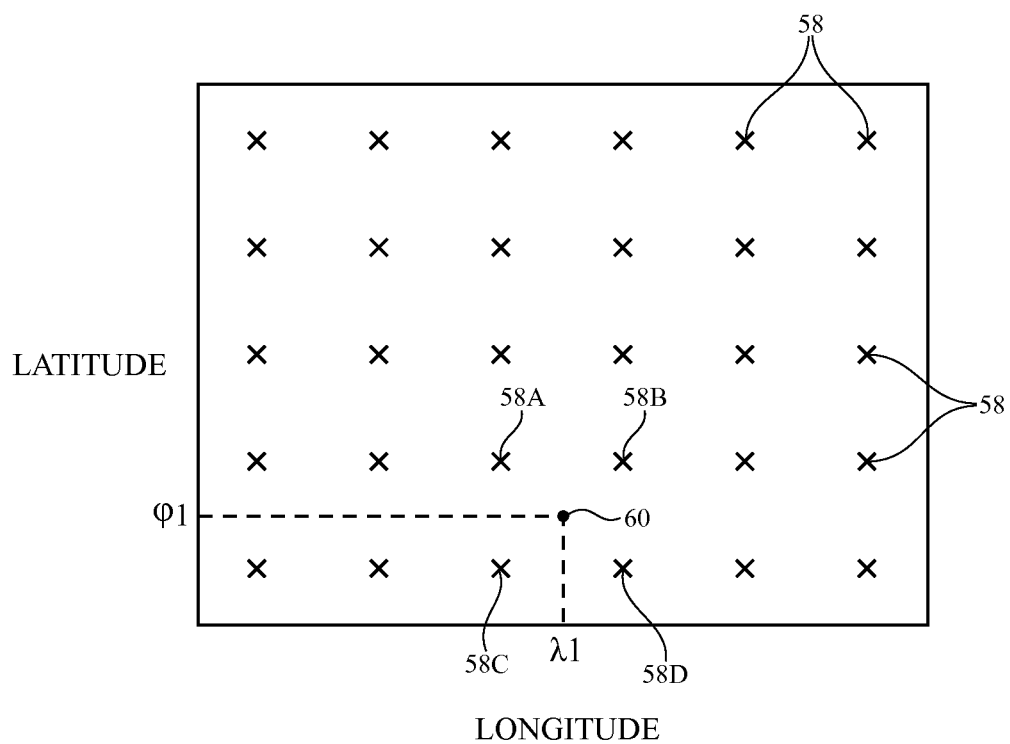
FIG. 5 is a diagram showing how a reference pressure value may be determined at a given location based on crowd-sourced reference pressure values at nearby locations in accordance with an embodiment of the present invention.

FIG. 5 is a diagram showing how a server such as server 20 of FIG. 3 may calculate a reference pressure value $P_{REF}$ at a grid of different geographic locations 58 (sometimes referred to herein as sample points). Each geographic location may be associated with a longitude ($\lambda$) and latitude ($\varphi$). The reference pressure value $P_{REF}$ at each sample point 58 may be determined using pressure sensor data that is collected from electronic devices 10 within a given area of the sample point 58 (e.g., using the method described in connection with FIG. 4).

In some embodiments, server 20 may continuously update reference pressure values at locations 58 (e.g., may continuously collect pressure samples from devices 10 in locations 58 and continuously update $P_{REF}$ at locations 58 based on the collected samples). In other embodiments, server 20 may periodically update reference pressure values at locations 58 or may update reference pressure values at locations 58 at triggered intervals. For example, server 20 may continuously collect pressure samples from devices in regions 58 but may re-compute $P_{REF}$ only when a query is received from an electronic device requesting a reference pressure value at a particular location.

When an electronic device 10 at a given one of geographic locations 58 requests a reference pressure value from server 20, server 20 may provide the reference pressure value $P_{REF}$ for that particular location to electronic device 10. In many situations, however, an electronic device 10 may be at a location 60 ($\lambda 1$, $\varphi 1$) between locations 58. In this scenario, when electronic device 10 at location 60 sends a request to server 20 for a reference pressure value, server 20 determines a reference pressure value at location 60 using the determined reference pressure values at nearby locations 58 (e.g., nearby locations 58A, 58B, 58C, and 58D). If desired, a digital elevation model (DEM) may be used to determine the correlation between sample points 58. For example, if the digital elevation model indicates that a mountain is interposed between two sample points, there would be a weaker correlation between the two sample points than if there were flat terrain between the two sample points. Methods such as least-squares collocation may also be used to determine a reference pressure value for location 60.

In some embodiments, the local reference pressure value at location 60 may be determined by server 20 and provided to electronic device 10. In other embodiments, server 20 may provide nearby reference pressure values (e.g., at locations 58A, 58B, 58C, and 58D) to electronic device 10 and electronic device 10 may determine the local reference pressure value based on the nearby values.

Upon determining a local reference pressure value at location 60, the altitude of electronic device 10 at location 60 with respect to a reference geoid (e.g., an equipotential surface modeling mean sea level) may be determined. For example, the altitude of electronic device 10 may be determined by subtracting the reference pressure value at location 60 from the pressure sensor signal output from pressure sensor 50 (FIG. 2), thereby removing any bias due to atmospheric weather conditions at location 60. The calibrated reference pressure (e.g., the pressure measurement from which weather bias has been removed) may then be converted to altitude using a desired standard atmosphere model. If desired, the altitude of electronic device 10 may be determined by server 20 and provided to electronic device 10 or may be determined using processing circuitry 40 of electronic device 10.

Figure 6:
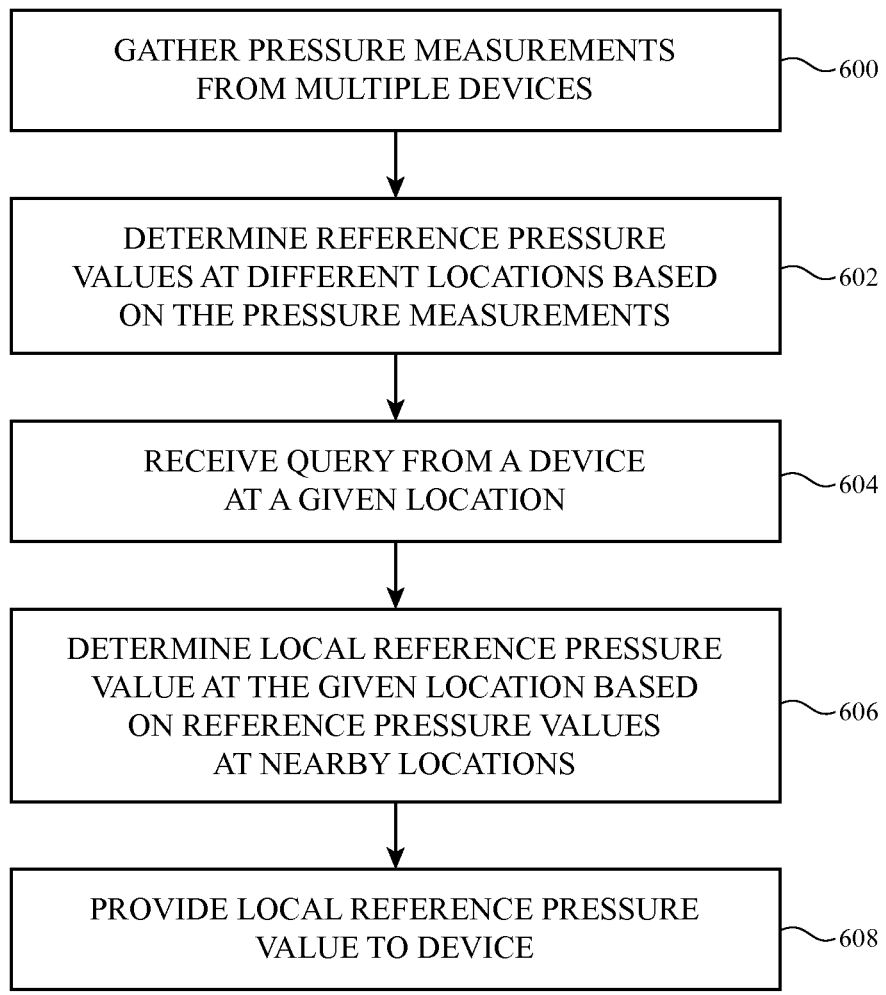
FIG. 6 is a flow chart of illustrative steps involved in determining a reference pressure value at a given location based on crowd-sourced reference pressure values at nearby locations in accordance with an embodiment of the present invention.

FIG. 6 is a flow chart of illustrative steps involved in providing a local reference pressure from a server to an electronic device as described in connection with FIGS. 3, 4, and 5.

At step 600, server 20 may gather pressure measurements from multiple electronic devices at different geographic locations (e.g., different latitudes and longitudes). This may include, for example, receiving pressure measurements output by pressure sensors 50 over network 22. As an example, server 20 may gather pressure samples from 1000 devices at each location in a grid of locations (e.g., a grid of latitudes and longitudes). If desired, pressure measurements may be collected continuously or may be collected at designated intervals (e.g., periodic intervals that are triggered automatically or intervals that are triggered by a particular activity such as a request from a client device).

At step 602, server 20 may determine reference pressure values at respective geographic locations (sometimes referred to herein as sample points) based on the collected pressure sensor measurements. For example, server 20 may repeatedly compute an average of N samples drawn from the crowd-sourced pressure data at a particular location to determine a reference pressure value $P_{REF}$ for that particular location. This is, however, merely illustrative. In some embodiments, the distribution of pressure may be a normal distribution and it may not be necessary to compute the average. In general, any suitable method may be used to estimate a reference pressure value for a particular location based on crowd-sourced pressure data. Arrangements in which the distribution of the average of N pressure samples is used to determine a reference pressure value $P_{REF}$ is sometimes described herein as an illustrative example.

At step 604, server 20 may receive a query from an electronic device 10 at a particular geographic location requesting a reference pressure value for that particular location.

At step 606, server 20 may determine the reference pressure value at the requested location. If electronic device 10 is located at one of the sample points for which a reference pressure value was calculated in step 604, server 20 may use that value as the reference pressure value for electronic device 10. If, on the other hand, electronic device 10 is located between the sample points with calculated reference pressure values, server 20 may determine a local reference pressure value for electronic device 10 based on the reference pressure values at nearby sample points. This may include, for example, using a digital elevation model (DEM) to determine the correlation between nearby sample points, using least-squares collocation to determine the correlation between nearby sample points, and/or using other suitable methods to estimate a local reference pressure for electronic device 10 based on nearby crowd-sourced reference pressure values.

At step 608, server 20 may provide the local reference pressure value to electronic device 10 (e.g., over network 22). Electronic device 10 may then use the local reference pressure value to calibrate its own pressure sensor signal by subtracting the reference pressure value from the pressure sensor signal to remove any bias due to atmospheric weather conditions.

The example of FIG. 6 in which reference pressure values are calculated for different locations prior to receiving a query from electronic device 10 is merely illustrative. If desired, step 600 in which pressure samples are gathered may be repeated until a query is received from device 10 (step 604), at which point server 20 may determine the reference pressure values at the grid of sample points (step 602).

Electronic device 10 may calculate altitude using the following equation:

$$P\text{altitude} = P\text{measured} - P_{REF} - SB - E \quad (1)$$

$$\text{altitude} = f(P\text{altitude}) \quad (2)$$

where Paltitude corresponds to the calibrated pressure sensor signal to be converted to altitude; Pmeasured corresponds to the pressure sensor signal output from pressure sensor 50; $P_{REF}$ corresponds to the local reference pressure value (determined using the process described in FIG. 6); SB corresponds to the bias associated with sensor 50; E corresponds to any remaining error terms (which may be estimated or negligible); and $f$(Paltitude) is a function of Paltitude that converts Paltitude into altitude using a desired standard atmosphere model.

In some scenarios, the sensor bias SB may be negligible and/or may be accounted for in the local reference pressure value $P_{REF}$. In other scenarios, it may be desirable to determine the bias SB associated with sensor 50 to further improve the accuracy of the altitude estimation. If the sensor bias is significant and is not a known value (e.g., a known sensor bias value stored in device 10), electronic device 10 can estimate the sensor bias using crowd-sourced reference pressure information. For example, if the altitude of device 10 is well-estimated using location detection circuitry in electronic device 10 (e.g., if global navigation satellite system receiver circuitry 48 can reliably determine the altitude of device 10), control circuitry 40 can estimate the sensor bias by reversing equation (2) to determine Paltitude, which can then be plugged into equation (2) to determine SB.

Figure 7:
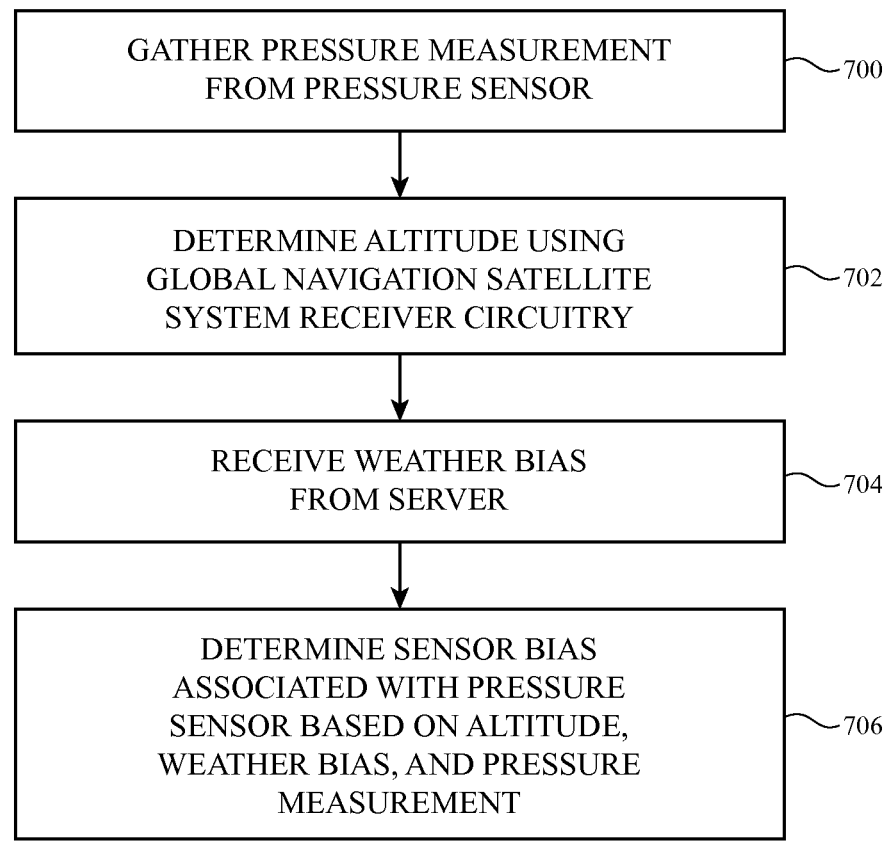
FIG. 7 is a flow chart of illustrative steps involved in determining a sensor bias associated with a pressure sensor using crowd-sourced reference pressure data in accordance with an embodiment of the present invention.

FIG. 7 is a flow chart of illustrative steps involved in estimating a sensor bias associated with pressure sensor 50 of FIG. 2. The process of FIG. 7 may occur when the altitude of electronic device 10 can be well estimated using satellite navigation circuitry 48 and/or IEEE 802.11 transceiver circuitry 44.

At step 700, control circuitry 40 may gather a pressure measurement (Pmeasured) from pressure sensor 50.

At step 702, control circuitry 40 may determine the altitude of electronic device 10 using satellite navigation circuitry 48 and/or IEEE 802.11 transceiver circuitry 44.

At step 704, control circuitry 702 may request and receive the local weather bias $P_{REF}$ using the process described in FIG. 6.

At step 706, control circuitry 40 may determine the sensor bias associated with sensor 50 based on the altitude, weather bias ($P_{REF}$), and measured pressure (Pmeasured). This may include, for example, rearranging equations (1) and (2) to determine the sensor bias SB.

If desired, server 20 may collect pressure sensor bias values from multiple electronic devices 10. The crowd-sourced pressure sensor bias estimates may in turn be used to refine the weather bias estimate ($P_{REF}$) in a particular region. For example, the crowd-sourced sensor bias estimate may be subtracted from $P_{REF}$ (determined using the process of FIG. 6) to separate the sensor bias from the weather bias.

Figure 8:
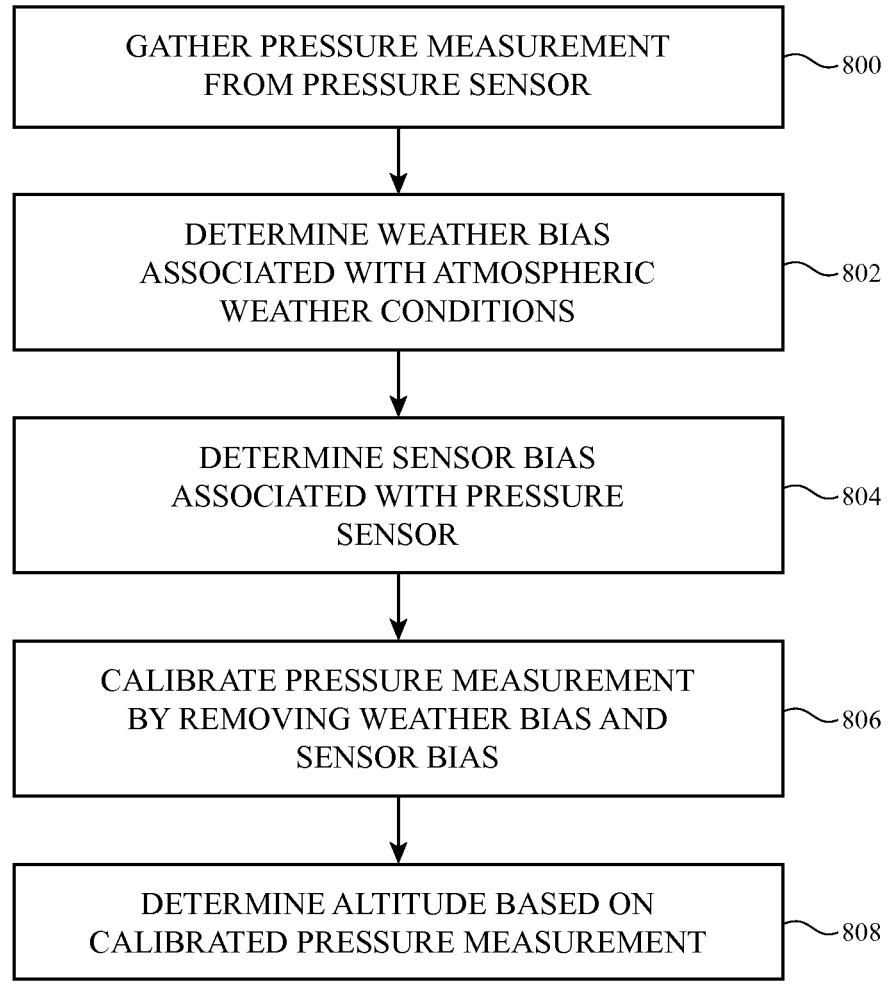
FIG. 8 is a flow chart of illustrative steps involved in determining the altitude of an electronic device at a given location based on crowd-sourced reference pressure data in accordance with an embodiment of the present invention.

FIG. 8 is a flow chart of illustrative steps involved in determining the altitude of electronic device 10 at a particular location using crowd-sourced pressure information.

At step 800, control circuitry 40 may gather a pressure sensor measurement (Pmeasured) from pressure sensor 50.

At step 802, control circuitry 40 may determine a weather bias ($P_{REF}$) associated with atmospheric weather conditions around electronic device 10. This may include, for example, requesting and receiving a local reference pressure value from a server. The server may determine the local reference pressure value using crowd-sourced reference pressure measurements from electronic devices in the vicinity of electronic device 10 as described in connection with FIG. 6.

At optional step 804, control circuitry 40 may determine a sensor bias (SB) associated with sensor 50. This may include, for example, estimating the sensor bias using the process described in FIG. 7. In other scenarios, the sensor bias may be a predetermined value that is stored in electronic device 10. In some arrangements, the sensor bias may be a stable value and need not be re-calculated often or at all. In other arrangements, the sensor bias may vary as the temperature of sensor 50 varies. If desired, a look-up table or other reference indicating the relationship between sensor bias and sensor temperature may be stored in electronic device 10 so that control circuitry 40 can accurately determine the sensor bias associated with pressure sensor 50 at a given time. In some scenarios, the sensor bias associated with pressure sensor 50 may be negligible and step 804 may be omitted.

At step 806, control circuitry 40 may calibrate the pressure measurement (Pmeasured) by removing the weather bias ($P_{REF}$) and sensor bias (SB) as shown in equation (1). If any other error terms (E) are known or well-estimated, those may also be subtracted from the pressure measurement in step 806.

At step 808, control circuitry 40 may determine the altitude of electronic device 10 by converting the calibrated pressure measurement to altitude using a standard atmosphere model as shown in equation (2).

If desired, step 808 may include determining the altitude of electronic device 10 relative to sea level. In some scenarios, it may be desirable to determine the altitude of electronic device 10 relative to ground level. This may be achieved using digital elevation models stored or otherwise accessed on electronic device 10. Digital elevation models can provide bare earth altitude representations of a region. If a digital elevation model is available for the region in which electronic device 10 is located, control circuitry 40 can subtract the digital elevation model bare earth altitude from the altitude estimated from pressure. The resulting altitude will therefore correspond to the altitude of electronic device 10 relative to ground level, which in turn can be used to determine a floor level (e.g., which floor of a building electronic device 10 is located on).

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:
   a pressure sensor that measures pressure values;
   wireless communications circuitry that receives a reference pressure value from a server; and
   control circuitry that determines an altitude of the electronic device based on the pressure values and the reference pressure value, wherein the reference pressure value is based on crowd-sourced reference pressure data from a plurality of electronic devices within a vicinity of the electronic device and wherein the control circuitry determines a sensor bias associated with the pressure sensor based on the reference pressure value.

2. The electronic device defined in claim 1 further comprising:
   global navigation satellite system receiver circuitry that determines a geographic location of the electronic device, wherein the wireless communications circuitry transmits the geographic location of the electronic device to the server.

3. The electronic device defined in claim 2 wherein the reference pressure value is based on the geographic location of the electronic device.

4. The electronic device defined in claim 1 wherein the control circuitry determines a floor level on which the electronic device is located based on the altitude and a digital elevation model.

5. The electronic device defined in claim 1 wherein the reference pressure value indicates a weather bias associated with atmospheric weather conditions, wherein the control circuitry calibrates the pressure values by removing the sensor bias and the weather bias, and wherein the altitude is determined using the calibrated pressure values.

6. A method for operating an electronic device that communicates with a server over a wireless network, comprising:
   with a pressure sensor in the electronic device, measuring pressure and outputting a corresponding pressure measurement;
   with wireless communications circuitry in the electronic device, receiving a reference pressure value from the server over the wireless network; and
   with control circuitry in the electronic device, determining an altitude of the electronic device based on the pressure measurement and the reference pressure value, wherein the reference pressure value is based on crowd-sourced pressure measurements from a plurality of electronic devices and wherein determining the altitude of the electronic device comprises subtracting the reference pressure value from the pressure measurement.

7. The method defined in claim 6 further comprising:
   with global navigation satellite system receiver circuitry, determining a location of the electronic device; and
   with the wireless communications circuitry, transmitting the location to the server, wherein the reference pressure value is based on the location.

8. The method defined in 6 further comprising:
   determining a sensor bias associated with the pressure sensor; and
   calibrating the pressure measurement by removing the sensor bias, wherein determining the altitude of the electronic device comprises determining the altitude of the electronic device based on the calibrated pressure measurement.

* * * * *